(12) United States Patent
Dai

(10) Patent No.: US 8,452,979 B2
(45) Date of Patent: May 28, 2013

(54) PORTABLE TELECOMMUNICATIONS APPARATUS

(75) Inventor: Jason Dai, Port Moody (CA)

(73) Assignee: Nokia Corporation, Espoo (FI)

( * ) Notice: Subject to any disclaimer, the term of this patent is extended or adjusted under 35 U.S.C. 154(b) by 869 days.

(21) Appl. No.: 12/301,754

(22) PCT Filed: May 22, 2007

(86) PCT No.: PCT/EP2007/004520
§ 371 (c)(1),
(2), (4) Date: Jun. 23, 2009

(87) PCT Pub. No.: WO2007/134834
PCT Pub. Date: Nov. 29, 2007

(65) Prior Publication Data
US 2010/0005313 A1    Jan. 7, 2010

(30) Foreign Application Priority Data
May 24, 2006  (GB) .................................. 0610275.0

(51) Int. Cl.
*H04L 9/32*    (2006.01)
(52) U.S. Cl.
USPC ........... 713/185; 713/168; 713/172; 713/173; 713/175; 713/186; 726/20; 380/270; 380/277
(58) Field of Classification Search
USPC .. 713/172, 185, 168, 173, 175, 186; 380/277, 380/270; 726/20
See application file for complete search history.

(56) References Cited

U.S. PATENT DOCUMENTS

| | | | |
|---|---|---|---|
| 6,119,020 | A | 9/2000 | Miller et al. |
| 6,141,563 | A | 10/2000 | Miller et al. |
| 7,139,915 | B2 * | 11/2006 | DeTreville ..................... 713/172 |
| 7,302,572 | B2 * | 11/2007 | Shinriki et al. ............... 713/172 |

(Continued)

FOREIGN PATENT DOCUMENTS

| | | |
|---|---|---|
| CN | 147274 | 1/2004 |
| EP | 0 301 740 | 2/1989 |

(Continued)

OTHER PUBLICATIONS

Great Britain Search Report for Great Britain Application No. GB0610275.0 dated Aug. 17, 2006.

(Continued)

*Primary Examiner* — Kambiz Zand
*Assistant Examiner* — Tongoc Tran
(74) *Attorney, Agent, or Firm* — Harrington & Smith

(57) ABSTRACT

Portable telecommunications apparatus having one or more functionalities including providing user access to a telecommunications network, the portable telecommunications apparatus comprising integrated circuit card (ICC) reader circuitry, storage circuitry and processing circuitry, wherein the ICC reader circuitry is configured to communicate with one or more network-access ICCs; the storage circuitry is arranged to comprise a list of at least one network-access ICC authorised for use with the apparatus; and wherein the processing circuitry is arranged to undertake an authentication process on removable storage circuitry in communication with the apparatus to determine whether or not the security circuitry is authenticated for use with the apparatus; to allow the authorisation of network-access ICCs in the storage circuitry according to whether authenticated security circuitry is in communication with the apparatus; and to permit a user access to the one or more functionalities of the apparatus according to whether an authorised network-access ICC is in communication with the ICC reader circuitry.

26 Claims, 1 Drawing Sheet

U.S. PATENT DOCUMENTS

| | | | |
|---|---|---|---|
| 7,606,560 B2 * | 10/2009 | Labrou et al. | 455/411 |
| 8,015,407 B2 * | 9/2011 | Basquin | 713/169 |
| 8,078,147 B2 * | 12/2011 | Anzai | 455/411 |
| 8,166,530 B2 | 4/2012 | Adams et al. | 726/9 |
| 2003/0037264 A1 * | 2/2003 | Ezaki et al. | 713/202 |
| 2004/0072592 A1 * | 4/2004 | Hasegawa | 455/558 |
| 2006/0245594 A1 * | 11/2006 | Terada et al. | 380/277 |
| 2006/0264240 A1 * | 11/2006 | Arai | 455/558 |
| 2006/0265340 A1 * | 11/2006 | Ziv et al. | 705/76 |
| 2006/0291660 A1 * | 12/2006 | Gehrmann et al. | 380/277 |
| 2007/0168674 A1 * | 7/2007 | Nonaka et al. | 713/182 |
| 2008/0260156 A1 * | 10/2008 | Baba et al. | 380/277 |

FOREIGN PATENT DOCUMENTS

| | | |
|---|---|---|
| EP | 1 523 202 | 4/2005 |
| JP | 2005311520 | 11/2005 |
| WO | WO 2004/093412 | 10/2004 |

OTHER PUBLICATIONS

International Search Report for PCT Application No. PCT/EP2007/004520.

* cited by examiner

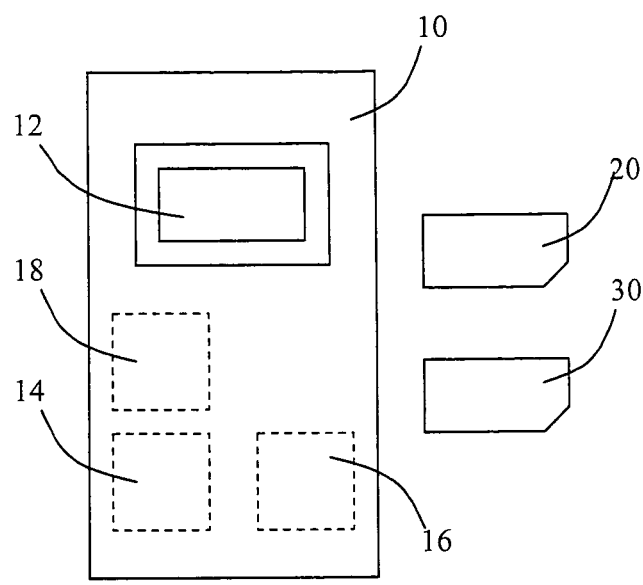

PORTABLE TELECOMMUNICATIONS APPARATUS

The invention relates to portable telecommunications apparatus for providing user access to a telecommunications network and associated apparatus and methods.

BACKGROUND OF THE INVENTION

As more and more people in the world use their mobile phones (especially smart phones) as a daily necessity for personal communication, as a personal information manager (PIM) and/or for doing business, loss or theft of the phone means not only loss of property but also the potential leak of personal information, client information and/or company information to, and illegal use by, an unauthorised person, even after the loss or theft is reported to the carrier or to the police.

Several measures have been taken to protect the security of mobile phones. For example, SIM-locking the mobile phone to a SIM (subscriber identity module) card may reduce the possibility of the phone being used with another SIM card. Enabling the PIN security feature of a mobile phone ensures that it can only be used if the PIN has been keyed in. Mobile carriers are able to block the use of customers' lost or stolen mobile phones on their network. However, all of these security features are soft, meaning that the security features are not difficult to be unlocked by hackers or crackers and therefore offer limited protection to the information stored in the phone. High-end smart phones are targeted by phone thieves in some countries because of their re-use values, at least as a PIM or an entertainment device, for instance as a game-player, a camera and/or a music player in offline mode.

SUMMARY OF THE INVENTION

According to a first aspect of the invention, there is provided portable telecommunications apparatus having one or more functionalities including providing user access to a telecommunications network, the portable telecommunications apparatus comprising integrated circuit card (ICC) reader circuitry and processing circuitry, wherein
the ICC reader circuitry is configured to communicate with one or more network-access ICCs; and
the processing circuitry is arranged
to undertake an authentication process on removable security circuitry in communication with the apparatus to determine whether or not the security circuitry is authenticated for use with the apparatus;
to allow the authorisation of network-access ICCs in storage circuitry according to whether authenticated security circuitry is in communication with the apparatus; and
to permit a user access to the one or more functionalities of the apparatus according to whether an authorised network-access ICC is in communication with the ICC reader circuitry.

In this way, a user, having purchased the telecommunications apparatus, may use his removable security circuitry in order to authorise his network-access ICC for use with the telecommunications apparatus. Having done so, he removes the security circuitry and inserts his newly-authorised network-access ICC into the ICC reader circuitry. The processing circuitry then permits him access to the functionalities of the apparatus, which include access to the network. He then puts his security circuitry away for safekeeping. If the apparatus is stolen or lost, the thief or another person may replace the authorised network-access ICC with his own unauthorised network-access ICC. However, the processing circuitry will not permit the thief access to the functionalities of the apparatus with such an unauthorised network-access ICC. Furthermore, the thief or another person is not able to authorise his own network-access ICC for use with the apparatus because he does not have a security circuitry which is capable of passing the authentication process with the apparatus.

By separating the security circuitry from the telecommunications apparatus, the user holds a physical key for the legal ownership of the phone.

The telecommunications apparatus may be a simple mobile phone or a smart phone, for example. The network-access ICC may be a SIM card where a GSM protocol is used, a USIM (universal subscriber identity module) card where a UMTS protocol is used, or a RUIM (Removable User Identity Module/Re-Usable Identification Module) card where a CDMA protocol is used, or variations thereof for example.

In one embodiment, the telecommunications apparatus includes indication circuitry being arranged to be actuatable by the processing circuitry to communicate to a user a warning message upon detection by the processing circuitry of an unauthorised network-access ICC in communication with the ICC reader circuitry.

The telecommunications apparatus may also include indication circuitry being arranged to be actuatable by the processing circuitry to communicate to the user a warning message upon detection by the processing circuitry of unauthenticated security circuitry in communication with the apparatus.

The processing circuitry may be arranged to be operable, in the event of detection of an unauthorised network access ICC or unauthenticated security circuitry occurring a predetermined number of times, to destroy some or all of the contents of the storage circuitry. For example, the contents may be destroyed following three unsuccessful attempts by a thief to activate the apparatus with his own network-access ICC inserted into the ICC reader circuitry.

The processing circuitry may be arranged to allow the de-authorisation of network-access ICCs in the storage circuitry according to whether authenticated security circuitry is in communication with the apparatus.

The processing circuitry may be arranged to be operable to de-authorise an authorised network-access ICC upon receipt from the network of an indication that the apparatus is registered with the network as being lost or stolen. In the event that the apparatus is stolen, the apparatus is still operable to the thief for the period of time until the owner reports the theft to the carrier. Once the apparatus is reported stolen, the carrier programmes the network to transmit the indication, such that the thief is no longer able to use the apparatus.

The processing circuitry may be arranged to be operable to de-authorise an authorised network-access ICC upon receipt via the network of a specific indication pre-configured by the user. For example, the user may contact the network using means other than the telecommunications apparatus and enter a code or PIN identifying himself and/or his telecommunications apparatus. The network may be configured to transmit a message to the telecommunications apparatus identified by the user to instruct the apparatus to de-authorise some or all of the network-access ICCs included in its storage circuitry.

The storage circuitry may comprise immutable storage circuitry configured to store a public key of a signature key pair and a private key of an encryption key pair. The security circuitry may include a key certificate which is encrypted using a public key of the encryption key pair and signed using a private key of the signature key pair. During the authentication process, the processing circuitry may be arranged to be operable to use the private key of the encryption key pair to attempt to decrypt the content of the key certificate. Following successful decryption, the processing circuitry may be operable to use the public key of the signature key pair to determine whether or not a signature of the key certificate is authentic. The security circuitry is authenticated if the key certificate is successfully decrypted and its signature is authentic The processing circuitry may include a security module being arranged to be operable to undertake the authentication process.

The removable security circuitry may include a security ICC, the ICC reader circuitry being configured to read the security ICC. The security ICC may be read by dedicated security ICC reader circuitry rather than ICC reader circuitry configured to communicate with network-access ICCs.

The ICC reader circuitry may comprise a single ICC reader capable of reading both the network-access ICCs and security ICCs, or may comprise two separate ICC readers, one for network-access ICCs and the other for security ICCs. The use of a single ICC reader reduces the volume and weight of the apparatus.

The apparatus may comprise non-user-removable storage circuitry. Additionally or alternatively, the storage circuitry may be removable storage circuitry arranged for use with the apparatus.

The storage circuitry may be comprised on a remote electronic apparatus, and the telecommunications apparatus may be arranged to communicate with the storage circuitry of the remote electronic apparatus to allow authorisation of ICCs as authorised network-access ICCs.

The storage circuitry may be comprised on a remote electronic apparatus, and the telecommunications apparatus may be arranged to communicate with the storage circuitry of the remote electronic apparatus to allow access to a list of authorised network-access ICCs.

According to a second aspect of the invention, there is provided a software module for portable telecommunications apparatus, the apparatus having one or more functionalities including providing user access to a telecommunications network, the software module comprising communication code stored on one or more memories, the code being arranged to communicate with integrated circuit card (ICC) reader circuitry and storage circuitry, the ICC reader circuitry being configured to communicate with one or more network-access ICCs, the storage circuitry being arranged to comprise a list of at least one network-access ICC authorised for use with the apparatus; and processing code stored on one or more memories, the code being arranged to undertake an authentication process on removable security circuitry in communication with the ICC reader circuitry to determine whether or not the security circuitry is authenticated for use with the apparatus;

to allow the authorisation of network-access ICCs in the storage circuitry according to whether authenticated security circuitry is in communication with the apparatus; and to permit access to the one or more functionalities of the apparatus according to whether an authorised network-access ICC is in communication with the ICC reader circuitry.

According to a third aspect of the invention, there is provided portable telecommunications apparatus including the software module of the second aspect of the invention.

According to a fourth aspect of the invention, there is provided a method of configuring portable telecommunications apparatus having one or more functionalities including providing user access to a telecommunications network, the method comprising authorising one or more network-access ICCs for use with the telecommunications apparatus when removable authenticated security circuitry is in communication with the telecommunications apparatus;

disestablishing communication between the security circuitry and the apparatus;

establishing communication between a said authorised network-access ICC and the ICC reader circuitry.

The method may include de-authorising one or more authorised network-access ICCs when authenticated security circuitry is in communication with the apparatus.

According to a fifth aspect of the invention, there is provided a network element being configured for use with the portable telecommunications apparatus of the first aspect of the invention. Such elements may inhibit use of the telecommunications apparatus in the network upon receipt of appropriate signalling from the apparatus when the apparatus is used using an unauthorised network access ICC.

According to a sixth aspect, there is provided an apparatus comprising storage circuitry, the apparatus arranged to communicate with the aforementioned portable telecommunications apparatus to allow authorisation of ICCs as authorised network-access ICCs.

According to a seventh aspect, there is provided an apparatus comprising storage circuitry, the apparatus arranged to communicate with the aforementioned portable telecommunications apparatus to allow access to a list of authorised network-access ICCs.

The present invention includes one or more aspects, embodiments or features in isolation or in various combinations whether or not specifically stated (including claimed) in that combination or in isolation. Associated methods of assembly of the apparatus are also within the present disclosure.

BRIEF DESCRIPTION OF THE DRAWINGS

In order that the invention may more readily be understood, a description is now given, by way of example only, reference being made to the accompanying drawings, in which:

FIG. 1 is a schematic diagram of a mobile phone, a SIM card and a security card according to the invention.

DETAILED DESCRIPTION OF THE INVENTION

FIG. 1 shows a mobile phone 10 having an ICC reader 12, writable memory 14, a processor 16 and immutable memory 18. FIG. 1 also shows a SIM card 20 and a security card 30. "Immutable memory" is non-volatile, read-only memory, i.e. storage of contents which cannot be changed with current technology without damaging the storage.

During manufacture, two security key pairs unique/specific to the mobile phone 10 are created, an encryption key pair and a signature key pair, each pair including a private key and a public key. A key certificate is created, and is encrypted using the public key of the encryption key pair. The key certificate can be decrypted only with the private key of the same encryption key pair. The key certificate is signed using the private key of the signature key pair. The authenticity of the signature can be determined only with the public key of the signature key pair. The keys and key certificate are generated using hardware identifications of the mobile phone 10 and cryptographic algorithms, for example an algorithm of Pretty Good Privacy (PGP). The details of such algorithms are known to the skilled person.

The public key of the signature key pair and the private key of the encryption key pair are entered into the immutable memory 18, while the other keys are stored on the manufacturer's security server. The key certificate is burned into the security card 30.

The security card 30 resembles a normal SIM card but with a specific IE (Information Element) format to store the unique information of the protected phone (for example IMEI (international mobile equipment identity) and/or PSN (Product Series Number) and the key certificate. IE format is a protocol that describes what an IE stands for and how the content of an IE is encoded.

In one embodiment, the security card 30 is not readable by regular SIM card readers. This increases the difficulty for unauthorised parties to copy or forge a security card to inhibit unauthorised use of a phone. However, in the embodiment described, the security card 30 is readable by the regular SIM card reader 12 of the phone 10.

When the security card 30 is inserted into the ICC reader 12, the processor 16 undertakes a process of authentication. In this process, the processor 16 uses the private key of the encryption key pair to decrypt the content of the key certificate and, following successful decryption, uses the public key of the signature key pair to determine whether or not the signature is authentic. The security card 30 is authenticated if it passes both processes.

The processor 16 runs a SIM-card authorisation module in application software, the authorisation module being operable to authorise SIM cards 20 for use with the mobile phone 10. The writable memory 14 stores a list of authorised SIM cards 20. The list is encrypted with a key which is derived from the key certificate of the security card 30 and is accessible only when an authenticated security card 30 is inserted into the ICC reader 12. The processor 16 may also operate to deny access to the list when an authenticated security card is not inserted into the ICC reader 12. Similarly, the SIM-card authorisation module is accessible only when an authenticated security card 30 is inserted into the ICC reader 12.

In other embodiments, the store of a list of authorised SIM cards 20 is not located with the phone 10, but remote to it, for example, in a network element (not shown). Thus, to access the list of authorised SIM cards 20, the phone 10 has to communicate over the air interface (and/or a wired interface) to the network element to obtain access to the list of authorised SIM cards 20. In other embodiments, the remote element may be a remote device (e.g. another phone, a computer) which may not be considered to be a network element per se.

The processor 16 runs boot-up software which determines whether or not an authenticated security card 30 or an authorised SIM card 20 is in communication with the ICC reader 12. If an authenticated security card 30 is detected, the mobile phone 10 boots up with the SIM-card authorisation module accessible. If an authorised SIM card 20 is detected, the mobile phone boots up normally as a regular mobile phone but with the SIM-card authorisation module inaccessible.

In any other case, the mobile phone 10 does not boot up but instead communicates to the user a warning message, the message being visible via a display (not shown) of the mobile phone 10 and/or audible via a speaker or headset (not shown) of the mobile phone 10. The warning message can be customised by the user. The customised message may be displayed even after the contents of the writable memory 14 have been erased. By preventing the mobile phone 10 from booting up, not only is access to the network prevented, but access to all functionalities of the mobile phone 10 is also prevented. This is useful in the case that the mobile phone 10 has some capability as a PIM or as an entertainment device. The mobile phone 10 may be arranged to transmit signalling to a remote device/network element to indicate that an attempt has been made to use an unauthorised SIM card 20 or an un-authenticated security card 30 with that particular mobile phone. Details of the unauthorised SIM card 20, un-authenticated security card 30, and/or the mobile phone 10 may be provided in the signalling. This may enable appropriate action to be taken to disable use of the unauthorised SIM card 20, un-authenticated security card 30, and/or the mobile phone 10.

An authorised SIM card 20, whether or not inserted in the ICC reader 12, will be de-authorised by the processor 16 upon the receipt from network of an indication that the mobile phone 10 has been reported to the carrier as lost or stolen, and the processor 16 will reset the mobile phone 10 immediately.

A copy of the security card 30 can be made only by the manufacturer upon the request of a legal owner of the mobile phone 10. This is because the details of the signature key pair and encryption key pair are not readily derivable.

The security card 30 may be a ICC or a memory card/stick etc. Although the security card comprises associated security circuitry such circuitry may not necessarily be stored on hardware in the shape of a card. Other shapes of hardware are within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A portable telecommunications apparatus having one or more functionalities including providing user access to a telecommunications network, the portable telecommunications apparatus comprising:
   integrated circuit card (ICC) reader circuitry and processing circuitry, wherein
   the ICC reader circuitry is configured to communicate with one or more network-access ICCs; and
   the processing circuitry is arranged:
      to undertake an authentication process on security circuitry comprising a security card distinct from a SIM card, the security card being selectively removable from the ICC reader circuitry, the security circuitry being in communication with the apparatus to determine whether or not the security circuitry is authenticated for use with the apparatus;
      to allow the authorisation of network-access ICCs in storage circuitry according to whether authenticated security circuitry is in communication with the apparatus; and
      to permit a user access to the one or more functionalities of the apparatus according to whether an authorised network-access ICC is in communication with the ICC reader circuitry.

2. The telecommunications apparatus of claim 1 including indication circuitry being arranged to be actuatable by the processing circuitry to communicate to a user a warning message upon detection by the processing circuitry of an unauthorised network-access ICC in communication with the ICC reader circuitry.

3. The telecommunications apparatus of claim 1 including indication circuitry being arranged to be actuatable by the processing circuitry to communicate to the user a warning message upon detection by the processing circuitry of unauthenticated security circuitry in communication with the apparatus.

4. The telecommunications apparatus of claim 1 wherein the processing circuitry is arranged to be operable, in the event of detection of an unauthorised network-access ICC or unauthenticated security circuitry occurring a predetermined number of times, to destroy some or all of the contents of the storage circuitry.

5. The telecommunications apparatus of claim 1 wherein the processing circuitry is arranged to allow the de-authorisation of network-access ICCs in the storage circuitry according to whether authenticated security circuitry is in communication with the apparatus.

6. The telecommunications apparatus of claim 1 wherein the processing circuitry is arranged to be operable to de-authorise an authorised network-access ICC upon receipt from the telecommunications network of an indication that the apparatus is registered with the telecommunications network as being lost or stolen.

7. The telecommunications apparatus of claim 1 wherein the processing circuitry is arranged to be operable to de-authorise an authorised network-access ICC upon receipt via the telecommunications network of a specific indication preconfigured by the user.

8. The telecommunications apparatus of claim 1 wherein the storage circuitry comprises immutable storage circuitry configured to store a public key of a signature key pair and a private key of an encryption key pair.

9. The telecommunications apparatus of claim 8 wherein the security circuitry includes a key certificate which is encrypted using a public key of the encryption key pair and signed using a private key of the signature key pair.

10. The telecommunications apparatus of claim 9 wherein, during the authentication process, the processing circuitry is arranged to be operable to use the private key of the encryption key pair to attempt to decrypt a content of the key certificate.

11. The telecommunications apparatus of claim 10 wherein, following successful decryption, the processing circuitry is arranged to be operable to use the public key of the signature key pair to determine whether or not a signature of the key certificate is authentic.

12. The telecommunications apparatus of claim 11 wherein the security circuitry is authenticated if the key certificate is successfully decrypted and the signature of the key certificate is authentic.

13. The telecommunications apparatus of claim 1 wherein the processing circuitry includes a security module being arranged to be operable to undertake the authentication process.

14. The telecommunications apparatus of claim 1 wherein the removable security circuitry includes a security ICC, the ICC reader circuitry being configured to read the security ICC.

15. The telecommunications apparatus of claim 1 comprising non-user-removable storage circuitry.

16. The telecommunications apparatus of claim 1 wherein the storage circuitry is removable storage circuitry arranged for use with the apparatus.

17. The telecommunications apparatus of claim 1 wherein the storage circuitry is comprised on a remote electronic apparatus, and the telecommunications apparatus is arranged to communicate with the storage circuitry of the remote electronic apparatus to allow authorisation of ICCs as authorised network-access ICCs.

18. The telecommunications apparatus of claim 1 wherein the storage circuitry is comprised on a remote electronic apparatus, and the telecommunications apparatus is arranged to communicate with the storage circuitry of the remote electronic apparatus to allow access to a list of authorised network-access ICCs.

19. A software module configured to execute in a portable telecommunications apparatus, the apparatus having one or more functionalities including providing user access to a telecommunications network, the software module configured to execute code comprising:

communication code stored on one or more memories, the code being arranged to communicate with integrated circuit card (ICC) reader circuitry and storage circuitry, the ICC reader circuitry being configured to communicate with one or more network-access ICCs, the storage circuitry being arranged to comprise a list of at least one network-access ICC authorised for use with the apparatus; and processing code stored on one or more memories, the code being arranged:

to undertake an authentication process on security circuitry comprising a security card distinct from a SIM card, the security card being selectively removable from the ICC reader circuitry, the security circuitry being in communication with the ICC reader circuitry to determine whether or not the security circuitry is authenticated for use with the apparatus;

to allow the authorisation of network-access ICCs in the storage circuitry according to whether authenticated security circuitry is in communication with the apparatus; and to permit access to the one or more functionalities of the apparatus according to whether an authorised network-access ICC is in communication with the ICC reader circuitry.

20. A portable telecommunications apparatus including the software module of claim 19.

21. A method of configuring a portable telecommunications apparatus having one or more functionalities including providing user access to a telecommunications network, the method comprising:

authorising one or more network-access ICCs for use with the telecommunications apparatus when authenticated security circuitry comprising a security card distinct from a SIM card, the security card being selectively removable from the one or more network-access ICCs is in communication with the telecommunications apparatus;

disestablishing communication between the security circuitry and the apparatus; and establishing communication between a said authorised network-access ICC and the ICC reader circuitry.

22. The method of claim 21 including de-authorising one or more authorised network-access ICCs when authenticated security circuitry is in communication with the apparatus.

23. A network element being configured to execute in the portable telecommunications apparatus of claim 1.

24. An apparatus comprising storage circuitry, the apparatus arranged to communicate with the apparatus of claim 1 to allow authorisation of ICCs as authorised network-access ICCs.

25. An apparatus comprising storage circuitry, the apparatus arranged to communicate with the apparatus of claim 1 to allow access to a list of authorised network-access ICCs.

26. A method of assembling a portable telecommunications apparatus, the apparatus having one or more functionalities including providing user access to a telecommunications network, the portable telecommunications apparatus comprising:

integrated circuit card (ICC) reader circuitry and processing circuitry, wherein the ICC reader circuitry is configured to communicate with one or more network-access ICCs; and the processing circuitry is arranged:

to undertake an authentication process on security circuitry in communication with the apparatus to determine whether or not the security circuitry is authenticated for use with the apparatus, the security circuitry comprising a security card distinct from a SIM card, the security card being selectively removable from the ICC reader circuitry;

to allow the authorisation of network-access ICCs in storage circuitry according to whether authenticated security circuitry is in communication with the apparatus; and to permit a user access to the one or more functionalities of the apparatus according to whether an authorised network-access ICC is in communication with the ICC reader circuitry, the method comprising assembling together the integrated circuit card (ICC) reader circuitry and processing circuitry.

\* \* \* \* \*